S. Harrington,
Scroll Saw.
No. 51,312. Patented Dec. 5, 1865.
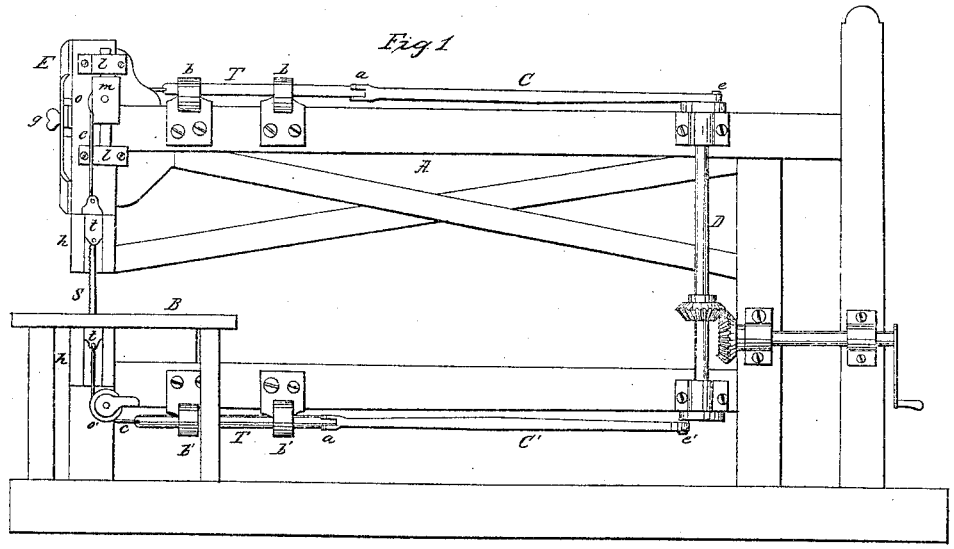
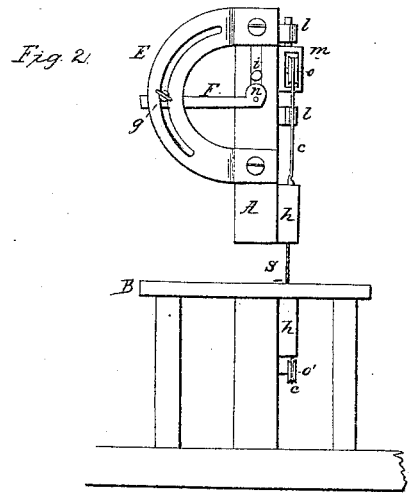
Witnesses:
P. T. Dodge
Thomas J. Gardner
Inventor:
Samuel Harrington
By W. E. Dodge
Attorney.

UNITED STATES PATENT OFFICE.

SAMUEL HARRINGTON, OF BALTIMORE, MARYLAND.

IMPROVEMENT IN SCROLL-SAWS.

Specification forming part of Letters Patent No. 51,312, dated December 5, 1865.

*To all whom it may concern:*

Be it known that I, SAMUEL HARRINGTON, of Baltimore, in the county of Baltimore and State of Maryland, have invented certain new and useful Improvements in the Manner of Mounting and Operating Scroll-Saws; and I do hereby declare that the following is a clear, full, and exact description thereof, reference being had to the accompanying drawings and to the letters of reference marked thereon, which are hereby made a part of this specification.

Figure 1 is a side elevation, and Fig. 2 is a front view of my improved machine.

The nature of my invention consists in a novel arrangement of the mechanism for giving a reciprocating motion to a scroll-saw, as hereinafter more fully explained.

To enable others skilled in the art to construct and use my improved machine, I will proceed to describe it.

A represents the overhanging frame, to the front end of which the saw S is attached, and B is the table for supporting the material to be sawed.

S represents the saw, which is secured at each end to a metal piece, $t$, fitted and sliding in the guides $h$. To each of these pieces $t$ is attached a cord, $c$, made preferably of silk, which, after extending vertically far enough to permit the requisite movement of the saw, passes over a pulley, $o$, at the top, and at the bottom over a similar pulley, $o'$, and are then connected to a rod, T, which slides freely in the bearings $b$ and $b'$. These rods T are pointed at $a$ to the pitmen C, which are connected at their rear ends to the crank-wrists $e$ above and $e'$ below, these crank-wrists being connected to the shaft D so as to stand opposite to each other, as shown in Fig. 1, the arrangement of these parts being the same at both top and bottom. By this arrangement it will be seen that as one crank moves backward the other will have the same movement forward, thereby drawing the cords $c$ alternately back and forth, and thus imparting to the saw $s$ a reciprocating motion.

The lower pulley, $o'$, is mounted in a stationary bearing, but the upper pulley, $o$, is mounted in a movable frame, $m$, which has a stem at each end moving loosely in the guides $l$. Attached to this movable frame $m$ is an arm, $i$, which is bent so as to pass through the slot in the front part of the frame A, as shown in Fig. 2, where it rests upon a cam-headed lever, F, pivoted to the front of the frame.

A slotted segment or frame, E, is secured to the front of the frame A, as there shown. Through the slot in this frame E a thumb-nut, $g$, extends, its inner end screwing into the lever F. By turning this lever F down, the cam $n$ is made to press against the arm $i$, attached to the movable frame $m$, which is thereby raised, and of course moves the pulley $o$ up, thus tightening the cords $c$ $c$ and keeping the saw strained tight.

By means of the thumb-screw $g$ the tension may be regulated as desired.

By this arrangement I insure keeping the saw always straight, relieve it from the weight of any frame, and, as it is operated by being pulled both ways, instead of being alternately pulled and pushed, it is prevented from doubling or cramping. The silk cords $c$ being extremely light, strong, and flexible, are found to operate far better than bands of leather or iron, which are sometimes used for a similar purpose.

The saw should in all cases be so attached to the frame A that its teeth shall point toward the front end of the frame A, as in that case the pressure applied in feeding the material against it is brought to bear lengthwise instead of sidewise of the frame, which is thereby rendered less likely to move or spring out of place.

Having thus fully described my invention, what I claim, and desire to secure by Letters Patent, is—

1. Operating the saw $s$ by means of the cords $c$, passing over the pulleys $o$ and $o'$, in combination with the sliding rods T and pitmen C, attached to crank-wrists $e$ and $e'$, arranged as shown and described.

2. Regulating the tension of the saw and cords by means of the movable frame $m$, lever F, and segment E, arranged to operate substantially as and for the purpose set forth.

SAMUEL HARRINGTON.

Witnesses:
P. TELL DODGE,
W. C. DODGE.